United States Patent [19]

Mayfield

[11] 4,174,130
[45] Nov. 13, 1979

[54] RECORD HANDLING DEVICE

[76] Inventor: Harold Mayfield, 2840 Fortune Dr., Granite City, Ill. 62040

[21] Appl. No.: 898,693

[22] Filed: Apr. 21, 1978

[51] Int. Cl.² .............................................. B65G 7/12
[52] U.S. Cl. .................................................. 294/25
[58] Field of Search ................... 294/25, 26, 6, 106; 274/1 R, 47

[56] References Cited

U.S. PATENT DOCUMENTS

| | | | |
|---|---|---|---|
| 2,614,838 | 10/1952 | Ziemke | 294/25 |
| 3,242,540 | 3/1966 | Mitchell | 294/25 |
| 4,084,824 | 4/1978 | Kalivas | 294/25 |

*Primary Examiner*—James B. Marbert
*Attorney, Agent, or Firm*—Rogers, Eilers & Howell

[57] ABSTRACT

A phonographic record handling device, preferably made of flexible plastic, has at one end a loop tapered to snugly receive the thumb, with an extension extending outwardly from the loop at an angle of about 10° to 20° from the horizontal plane extending across the sides of the thumb distal joint. A downwardly extending hook is at the other end of the extension. The hook is bent back towards the loop, but forwardly towards the front of the device for better alignment of the hook with a record spindle hole. The thumb is inserted in the loop and the hand is moved so that the hook extends into the record hole so that the record can be handled using but a single hand. The device can be shaped from a single flat strip of material.

16 Claims, 6 Drawing Figures

U.S. Patent   Nov. 13, 1979   4,174,130
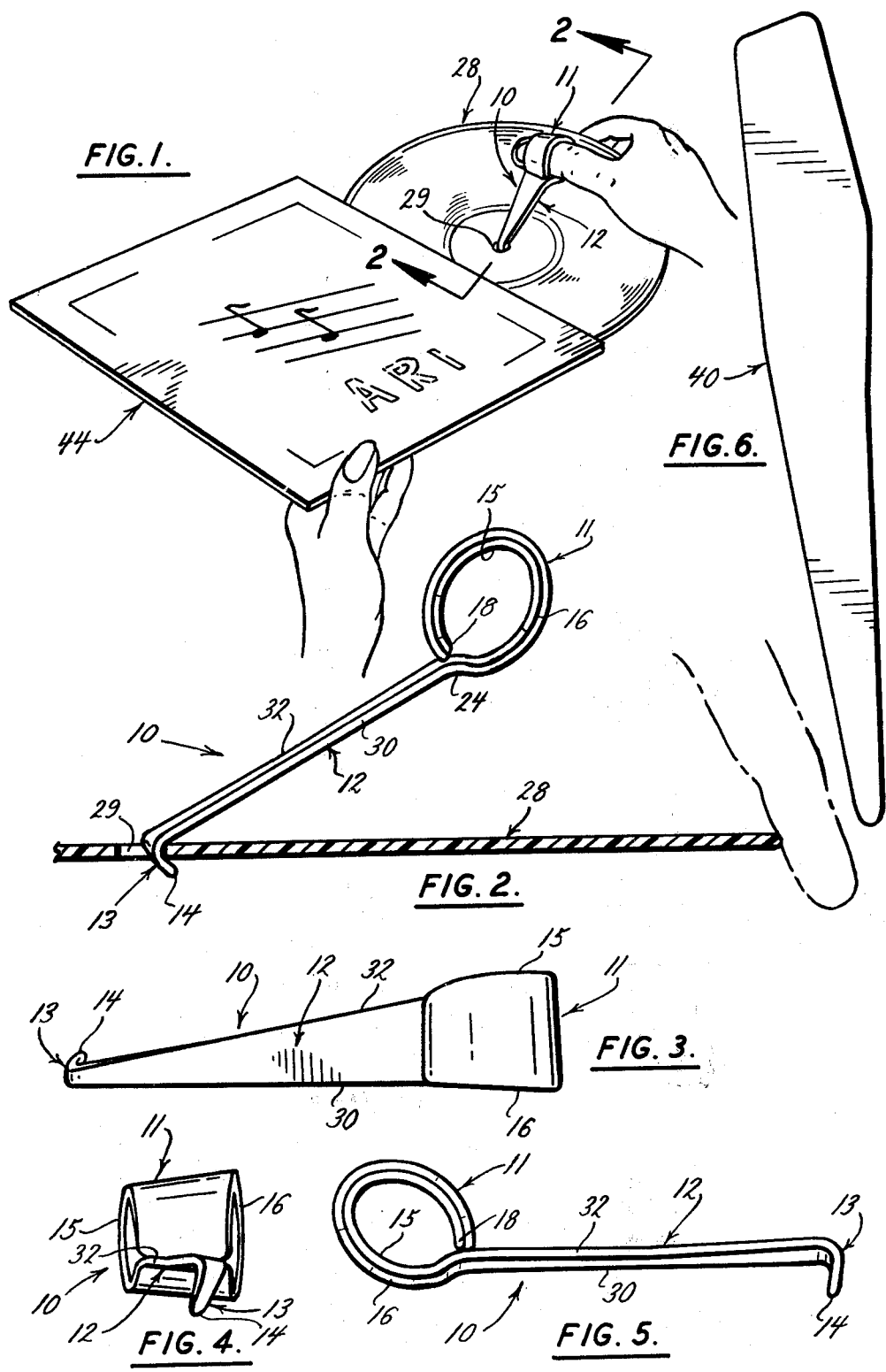

RECORD HANDLING DEVICE

BACKGROUND AND FIELD OF THE INVENTION

This invention relates to devices used by the hand to manipulate phonograph records so that the records can be placed upon the spindle of a record player. As is known in the art, a record player commonly has a spindle projecting perpendicular to the rotating turntable of the record player. Records, such as 33⅓ r.p.m. records are commonly placed upon the spindle, sometimes with several records stacked on the spindle so that the albums can be played. After the albums are played it is wise to place the albums in their record covers or jackets to protect them from dust or from being scraped by some object to cause damage to the record grooves.

It is highly desirable that in placing a record on the spindle, and in removing it from the spindle, that the hands not be placed upon the record grooves, as such placement causes damage to the grooves impairing the quality of the sound of the phonograph record when played, and presenting unsightly smudges on the record. However it is also desirable that the dexterity present in the human hands, which of course have more bones than any other part of the body, be utilized to as great an extent as possible. Yet it is also desirable to use a record handling device that is not clumsy or awkward to handle and which does not have moving parts which will need maintenance or which might malfunction rendering the device useless. It is furthermore desired to have such a record handling device that has relatively a small amount of material and which is convenient to store, and which can also allow the operator to perform other functions while having the device mounted to the hand.

Record handling devices have been known in the prior art. In some of these devices there are moving parts which must be squeezed by the hand in order to operate the device. Furthermore such devices, because of their complexity, increase the likelihood of accidental contact against the record grooves causing damage. Of course with a device having moving parts, a malfunction of a single part can render the device inadequate. Replacement maintenance is thus necessary, and because of the moving parts present, operational maintenance may be necessary.

Other record handling devices, although not having moving parts, are so large and awkward that they are inconvenient to handle and to store. Because of their awkward shape that can be easily broken and the chances for a clumsy accident are increased because of the size of the device.

SUMMARY OF THE INVENTION

The present invention overcomes the problems of the prior art. The invention comprises a record handling device which has formed at one end a tapered loop sized to snugly receive the thumb. Projecting from the loop is an extension wing which projects outwardly at an angle of about 10° to 20° from the horizontal plane extending across the sides of the distal knuckle of the thumb, to allow clearance of the extension above the record. At the other end of this extension is a downwardly extending hook which projects back towards the loop and also extends forwardly. The forward extension of the hook allows the hook to be aligned more easily with the spindle hole of a record, as, when the proximal and distal knuckles of the thumb flex downward as they naturally do when the hand is held outright, the hook will extend approximately in alignment with the record hole. The tilting of the hook is accomplished primarily by having the extension tilt upwardly from the rear to the front of the device.

The device can be formed from a single strip of flat material, such as plastic. The preferred embodiment is made of plastic as the plastic, being flexible, allows greater accommodation of varying thumb sizes. Also because of the shape of the loop, the plastic device prevents counterclockwise movement of the thumb relative to the loop (as viewed holding the right thumb outwardly in front of the face with the device mounted thereon). The device can also be made of a lightweight metal such as an aluminum alloy or the like in which case the benefits of flexibility are not present, but there is greater rigidity of the device.

Thus rather than having moving parts, as is present in many prior art devices, the present invention has no moving parts and requires practically no maintenance with no worries of malfunction resulting from the relative movement of parts to each other. Furthermore less time is needed to manufacture the invention as the lack of moving parts requires less time to be devoted to attaching parts together for proper movement, and to precision designing for the attachments.

Relatively few steps are needed to bend the single strip of material to form it into the proper shape for the device. The device also can be easily made by molding the plastic or metal, as is well known in the art.

Yet in not having any moving parts, the invention is relatively small and easy to handle. It can be secured to the thumb by the use of the hand having that thumb and also can be removed with that same hand. It is also small enough to be placed in a shirt pocket of ordinary size and of course can be stored in a convenient storage space.

Because the device has a loop which fits about the thumb, it is unnecessary to rely upon the gripping power of the hand to hold or to operate the device. This of course facilitates operation.

Furthermore because of the loop which fits around the thumb, and because of the small size of the device, the hand upon which the device is mounted can be used for other purposes even with the device mounted on the thumb. The use of one hand in mounting and dismounting a record also frees the other hand to perform other functions.

Thus the present device because of its simplicity provides great advantages in cost, maintenance, storage and ease and convenience of operation herebefore unknown to the art.

DESCRIPTION OF THE DRAWINGS

FIG. 1 is a perspective view of the record handling device showing the right hand thumb inserted within the loop of the device, and the hook inserted in the spindle hole of the record, with the record being removed from an album cover;

FIG. 2 is a view of the device in approximately full scale, taken on the line 2—2 of FIG. 1 with the right thumb not shown, with a finger shown in broken lines, and looking at the larger end of the tapered loop;

FIG. 3 is a top plan view of the approximately full scale device;

FIG. 4 is a plan view of the device taken from the left end of FIG. 3;

FIG. 5 is a plan view of the device taken from the left side of FIG. 4;

FIG. 6 is a top view of a flat strip of material shown in approximately full scale, which can be shaped to form the device.

DESCRIPTION OF THE PREFERRED EMBODIMENT

The record handling device 10, as seen in the drawings, has a loop section 11 for receipt of a right hand thumb, with the loop 11 extending leftwardly (as viewed looking at FIGS. 2 and 3) into a midsection extension wing 12, with the extension 12 turned downward at its other end to form a hook 13 for insertion in the spindle hole of a phonograph record. The device 10 can be formed from a unitary strip of material, such as shown in FIG. 6, and is preferably made of plastic, but can be of other lightweight material or of various metals. Plastic is a preferred composition because of its light weight and the ease with which it can be shaped.

The loop 11, as seen clearly in FIGS. 2-5, is tapered, so that it has an end 15 which has a smaller opening than the other larger end 16. The taper of the loop is shaped so as to comfortably receive the thumb of the right hand to allow insertion of the thumb up to the point where the distal joint or knuckle of the thumb will be slightly inserted beyond the larger end 16. In this particular illustration a device for the right hand is shown although it is easily understood that the device including the loop can be shaped to be used by the left hand thumb.

As seen in FIG. 2, the loop 11 beings with an end 18 which curves in a clockwise direction (as viewed looking at FIG. 2) to a transition bend 24 at which point the device bends into extension 12. The end 18 has a substantially straight edge having a clearance of about $\frac{1}{8}$ inch (0.3162 centimeters) above the bend 24. The extension 12 projects from the bend 24 outwardly from the loop 11 so that when the thumb is inserted within the loop, the extension 12 projects upwardly at an angle of about 10°-20°, and preferably 15°, from a plane extending horizontally from side to side across the distal knuckle of the thumb. The angle of the extension 12 relative to the loop thus allows ample clearance of the extension 12 above a phonograph record 28 when the hook is inserted in the record spindle hole 29. The hole normally has a diameter of 8 mm for a 33$\frac{1}{3}$ r.p.m. record. As seen in FIG. 2 the extension 12 has a substantially straight rear edge 30 and a rearwardly slanted front edge 32. The extension 12 tilts so that the front edge 32 tilts at an angle upwardly from the rear edge 30 relative to a plane extending laterally across the distal knuckle of an inserted thumb (FIGS. 4 and 5).

At the outer end of the extension 12, the hook 13 projects downwardly beneath the extension, and also forwardly by virtue of the tilting of the extension 12. The hook 13 has a lower tip 14 that is inserted through the record spindle hole 29 as seen in FIG. 2. The hook 13, as seen in FIG. 2, is bent towards the loop 11 to permit a proper grip upon the spindle hole. The forward slant of hook 13 allows insertion of the hook into the spindle hole at a direction that is in alignment with the central axis of the spindle hole, as upon insertion of the hook into the hole the distal and proximal knuckle of the thumb are naturally flexed downwardly, and therefore the forward tilt of the hook 13 compensates for the thumb bending to permit better alignment of the hook 13 with the spindle hole.

The device 10 can be formed from the flat layout pattern 40 of FIG. 6. This pattern can be of plastic as aforesaid. The larger end of the pattern 40 can be heated to a proper temperature well known in the art and rolled inwardly to form the loop 11. The middle section of the pattern 40 can be bent away from the loop so formed, to shape the bend 24 with the bend being shaped to form the proper tilt of the extension 12 as previously described.

The smaller end of pattern 40 is heated to the appropriate temperature and bent downwardly, towards the loop, and forwardly to form the hook 13. Thus it is not necessary to heat the middle section of the pattern 40 beyond the point where the bend 24 is formed, or beyond the point where the bend for the hook 13 begins. The portion of the pattern to be bent can be heated to the appropriate temperature depending upon the nature of the plastic, which temperature is well known in the art, so that the pattern can be shaped to the form desired. After such heating the device can be cooled so that the pattern is held in the position as shown in the drawings.

The device 10 can also be formed by pouring heated liquid plastic into a mold shaped to form the device 10, and then cooling the mold to allow solidification of the device 10, as is well understood in the art.

OPERATION

In operation the device 10 can be used to remove the phonograph record 28 from a record album cover 44 and to place the record on a record player spindle (not shown) well known in the art. This is done by holding the extension 12 with the left hand and inserting the right hand thumb into the larger end of the loop until the distal knuckle of the thumb is inserted just past the rear loop edge 16 and the tip of the thumb projects beyond the loop front edge 14. The position of the thumb can vary depending on the size of the thumb. The device can also be worn by using only the right hand to hold the loop 11 in position for insertion of the right thumb. As the thumb is inserted through the plastic loop, the loop will flex to an extent necessary to allow a snug fit about the thumb. With the thumb so inserted the left hand can be removed to grasp the album cover 44. The device 10 can be moved so that when the record 28 is slid from the album cover 44 to the position shown in FIG. 1, the right hand fingers can contact the outer edge of the record as seen in FIG. 2, so that no contact is made by the hand upon the grooves of the record, but contact is only against the outer record edge which does no harm to the sound recording grooves.

With the record 28 held in the position of FIG. 1, with one side supported by the album cover 44 and the other side supported by the right hand, the device 10 can be rocked downwardly by the thumb with the thumb being bent downwardly at the distal and proximal knuckles so as to align the hook 13 with the record hole 29. Such a bending movement of the knuckles is a natural movement and a comfortable one in that it allows the thumb to be in a better position for the grasping of the record.

With the thumb so bent, the hook 13 is then moved downwardly into the hole 29 until the inner side of the hook 13 contacts the edge of the hole as seen in FIG. 2. In this position the tip 14 of the hook is positioned at a point beyond the circumference of the hole 29 to prevent slippage of the hook from the hole. The positioning of the hook 13 at a point towards the rear of the extension 12 allows easier alignment of the hook with the record hole, as the hook 13 is positioned horizontally from the proximal joint.

The right hand fingers remain against the outer edge of the record. With the hook so inserted, the right hand can be moved away from the album cover 44, so that the hook 13 pulls the record out of the cover. At this time the record 28 is completely supported by the device 10 and the fingers of the right hand. There is no need to use the left hand to support the record and the album cover 40 can be placed by the left hand into a storage place or in a rack, as may be desired. The record can then be moved by the right hand to the record player spindle and positioned so that the spindle is aligned with the record hole 29. During all this time of course the left hand is free to manipulate any record player device or to perform any other functions. After the record hole 29 is aligned above the spindle, the left hand can be used to contact the outer edge of the record opposite the side where the right hand fingers are contacting the record, so that the record can be supported by the left and right hand fingers without either hand touching the record grooves. With the record supported by the fingers, the right thumb can then be rocked upwardly away from the hole 29 to remove the hook 13 from the hole 29 and position the tip 14 well above the record. When this is done the record can be moved downwardly so that the record spindle is inserted within the hole 29 and the record is mounted for play as is well known in the art.

The shape of the loop from its beginning end 18 counterclockwise to the bend 24 permits clockwise movement of the thumb relative to the loop (as viewed looking at FIG. 2), as such movement pulls the end 18 away from the bend 24 to increase the diameter of the loop. However counterclockwise movement of the thumb relative to the loop moves the end 18 towards the bend 24 because of the frictional engagement of the thumb against the inner surface of the loop, so that the diameter of the loop is decreased. Thus when the device 10 is moved in a counterclockwise direction by the thumb, as it will be moved when it is moved towards the record spindle, there will be no slippage of the thumb relative to the loop should for any reason the extension 12 be engaged by some other object, or if the tip 14 misses hole 29 and engages the record surface to cause a rotational counterclockwise force fo be exerted by the thumb against the loop.

After the record 28 is placed on the spindle and the hook 13 has been removed, the right hand can be withdrawn from the record.

Because of the small size of the handling device 10, the operator may pick up a pencil and write with the device still attached to the thumb with much convenience. Other right hand movements can be performed with the device secured to the thumb as aforesaid so that the device does not need to be removed from the thumb and intermittent functions can be performed by the right hand between the placing of records onto the spindle. To remove a record from the record spindle, the fingers of the hands can be placed around the record edges as aforesaid, and the record lifted above the spindle. The hook 13 can then be moved into the record hole and the record can be moved with the right hand to insert the record in the cover or place the record elsewhere.

When it is desired to remove the device 10 from the thumb the extension 12 can be grasped with the left hand and the right thumb pulled away from the loop to remove the device from the right hand. The device 10, being of small shape can be stored in a handy location for ready accessability. It can be conveniently placed in a shirt pocket, such as the shirt pocket of a standard size on male shirts, so that it does not extend above the top of the pocket. The device 10 can also be removed from the thumb by simply extending the middle finger of the right hand around against the extension 12 to pull the loop away from the right thumb to disengage the thumb from the loop. Thus the device 10 can be conveniently manipulated by but a single hand to mount and dismount the device 10 to the hand.

Because there are no moving parts to the device 10, problems concerning relative movement of components are eliminated. Maintenance of the device 10 is unnecessary because of its simple structure.

It is to be understood that the device 10 can be made to fit the shapes of various thumbs. The diameter of the loop can be made greater to accommodate larger thumbs, or smaller to accommodate smaller thumbs. However because of the flexibility of the loop, the size of the loop as shown in the drawings to scale can accommodate a large range of thumb sizes of the population.

The device 10 can also be shaped from metal such as an aluminum alloy in which case it is more durable than the plastic device, and less likely to be destroyed although it will be slightly heavier and more expensive to make because of the metal used. However such a metal device has many of the advantages aforesaid except that the loop is not flexible so as to increase and decrease in diameter with rotational movement of the thumb, and also does not flex to accommodate as wide a range of thumb sizes as the plastic device.

The length of the extension of course varies according to the diameter of the record and for the size of the record hole. However for an ordinary 33⅓ r.p.m. record, for which the full scale drawings of the device of FIGS. 2–5 are designed, an extension length of about 2¾ inches (6.98 centimeters) measured along the rear edge 30 has been found beneficial. A length of about ⅜ inch (0.852 centimeters) for the hook 13 has also been found beneficial.

Thus there has been provided a record handling device which requires a very small amount of material to make, which can be formed with relative ease from a flat strip of material, and which can be mounted and dismounted by but a single hand. The device can be used by but a single hand to hold a record, and move the record to a position for mounting onto a record spindle, thus allowing use of the other hand to perform other functions but rendering any squeezing action or other hand manipulation of the device unnecessary. Yet in doing all of this the device is small enough to be kept in a shirt pocket of ordinary size.

There are various changes and modifications which may be made to applicant's invention as would be apparent to those skilled in the art. However, any of these changes or modifications are included in the teaching of applicant's disclosure and he intends that his invention be limited only by the scope of the claims appended hereto.

I claim:

1. A handling device for a phonographic record having a spindle hole, the device being for use by a human hand, and comprising:
   (a) an extension member;
   (b) means at a first end of the extension member for securing the device to the thumb of the hand so that the extension member extends laterally outwardly from the side of the thumb in a direction transverse to the longitudinal axis of the thumb so that pulling force exerted upon the extension member pulls the handling device laterally from the side of the thumb; and
   (c) a hook extending downwardly from the second end of the extension member in a direction transverse to the longitudinal axis of the thumb for engaging insertion into the spindle hole.

2. The structure of claim 1 wherein the securing means is shaped to extend about the thumb.

3. The structure of claim 1 wherein the securing means comprises a member curved to conform to the shape of the thumb to fit about the thumb.

4. The structure of claim 1 wherein the securing means is a loop member which extends substantially about the exterior of the thumb to engage the thumb.

5. The structure of claim 4 wherein the loop member is tapered to have a larger end for initial insertion of the thumb, and a smaller end.

6. The structure of claim 4 wherein the loop member is unitary with the extension member; and wherein when the extension is positioned to extend outwardly laterally from the exterior side of the thumb, the loop extends from the extension member underneath the thumb around the interior side of the thumb and over the top of the thumb, with the end of the loop being free.

7. The structure of claims 4, 5, or 2 in which the loop member extends incompletely around the thumb and has an end which is positioned near the first end of the extension member.

8. The structure of claim 1 wherein the hook is substantially straight and is bent downwardly from the extension member and towards the securing means.

9. The structure of claim 1 wherein the hook is tilted forwardly from the extension.

10. The structure of claims 4 or 1 wherein the extension member is slanted upwardly.

11. The structure of claims 1, 4, 5 or 2 wherein the device is made of plastic.

12. The structure of claim 5 wherein the device is made of a unitary piece of plastic.

13. The structure of claims 1, 4, 5 or 2 wherein the device is made of a unitary piece of plastic.

14. A phonograph record handling device for use by a human hand for records having a spindle hole, the device comprising:
   (a) an extension member for extension outwardly from the exterior side of the thumb of the hand in a direction transverse to the longitudinal axis of the thumb;
   (b) the extension member at a first end extending into a unitary loop section curving first underneath the thumb then around the interior side of the thumb and then over the top of the thumb, and;
   (c) at a second end of the extension member the extension member extends downwardly into a unitary hook for insertion into the record hole.

15. The structure of claim 14 wherein the device is formed from a unitary sheet of material by bending one end of the sheet to form the unitary loop section, and bending the second end of the extension member into the hook.

16. The structure of claim 14 wherein the device is formed of a unitary sheet of plastic.

* * * * *